Figure 5:
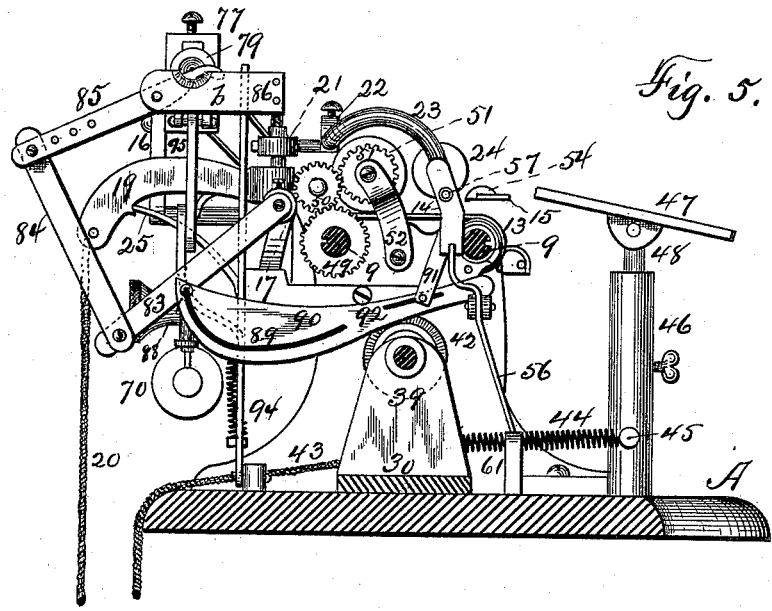

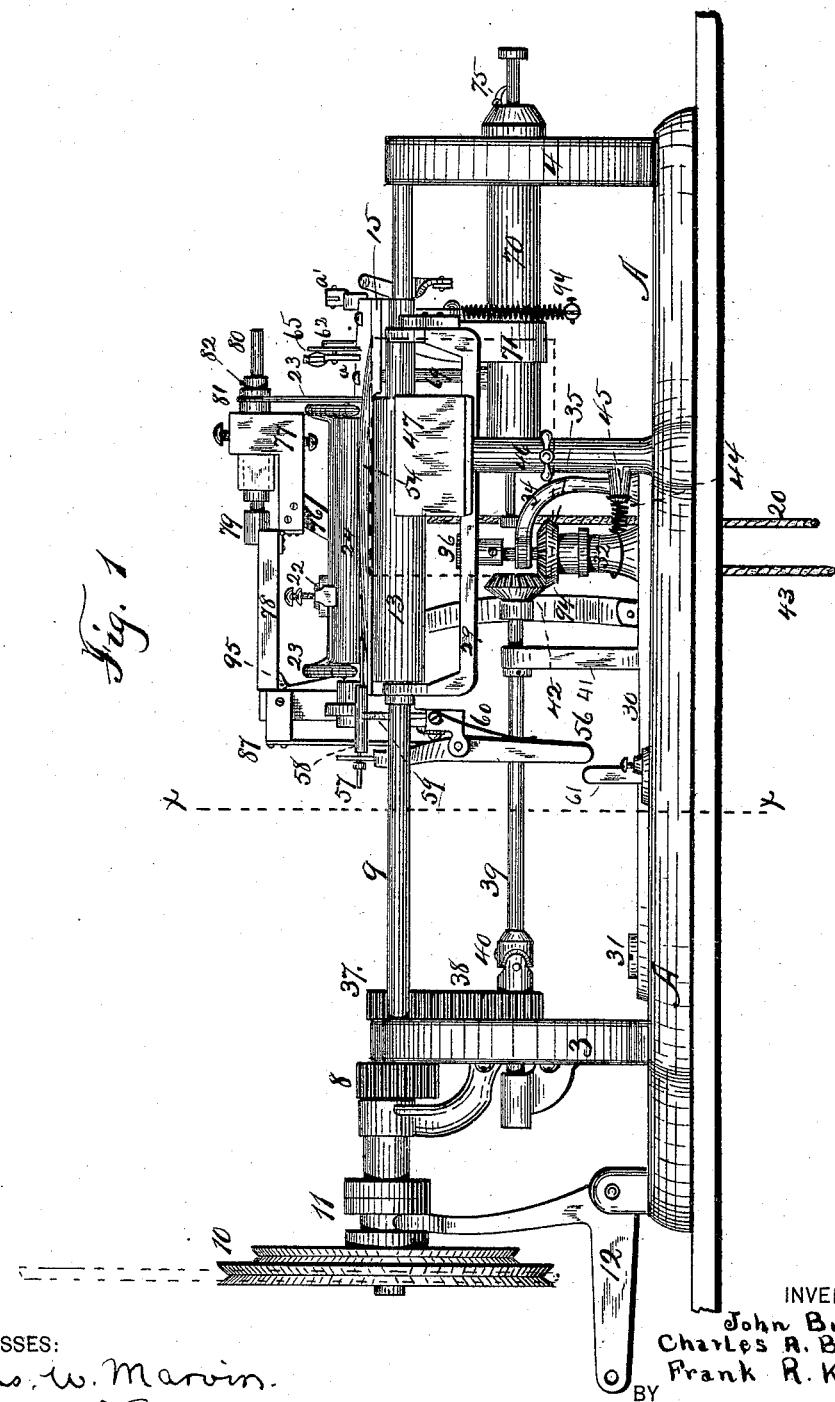

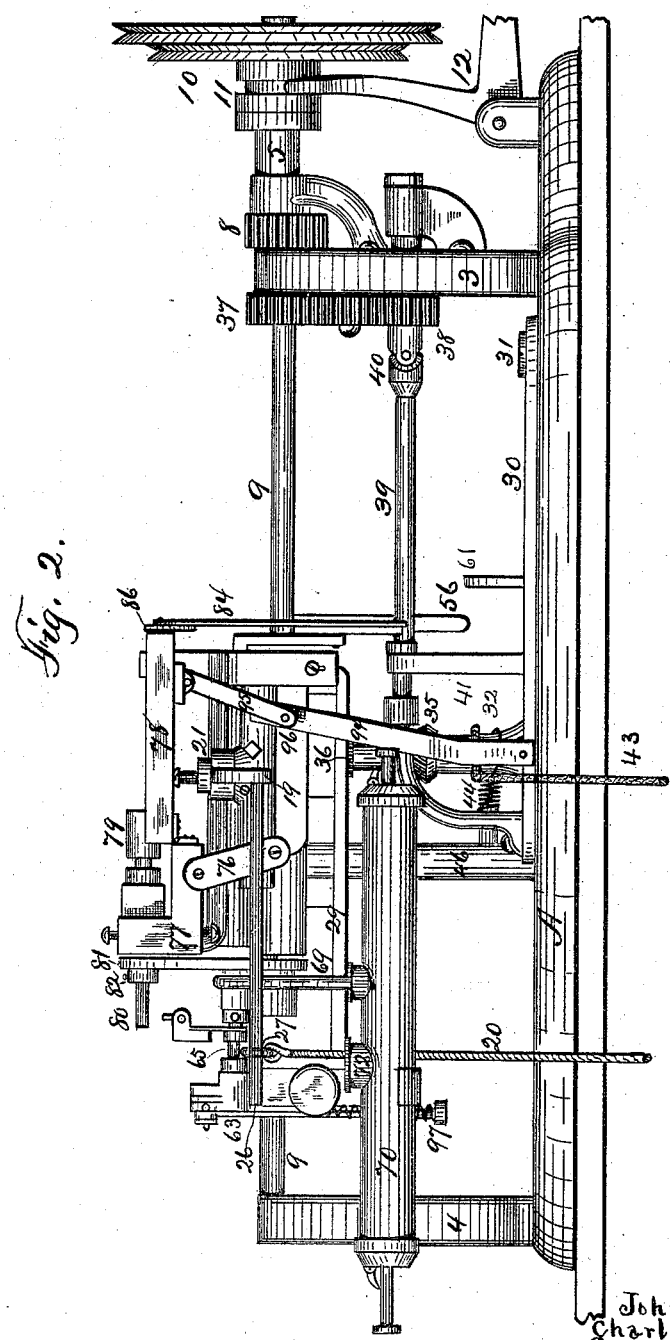

(No Model.) 9 Sheets—Sheet 3.
J. BUNN, C. A. BAKER & F. R. KEYES.
CIGAR BUNCH ROLLING MACHINE.
No. 535,048. Patented Mar. 5, 1895.
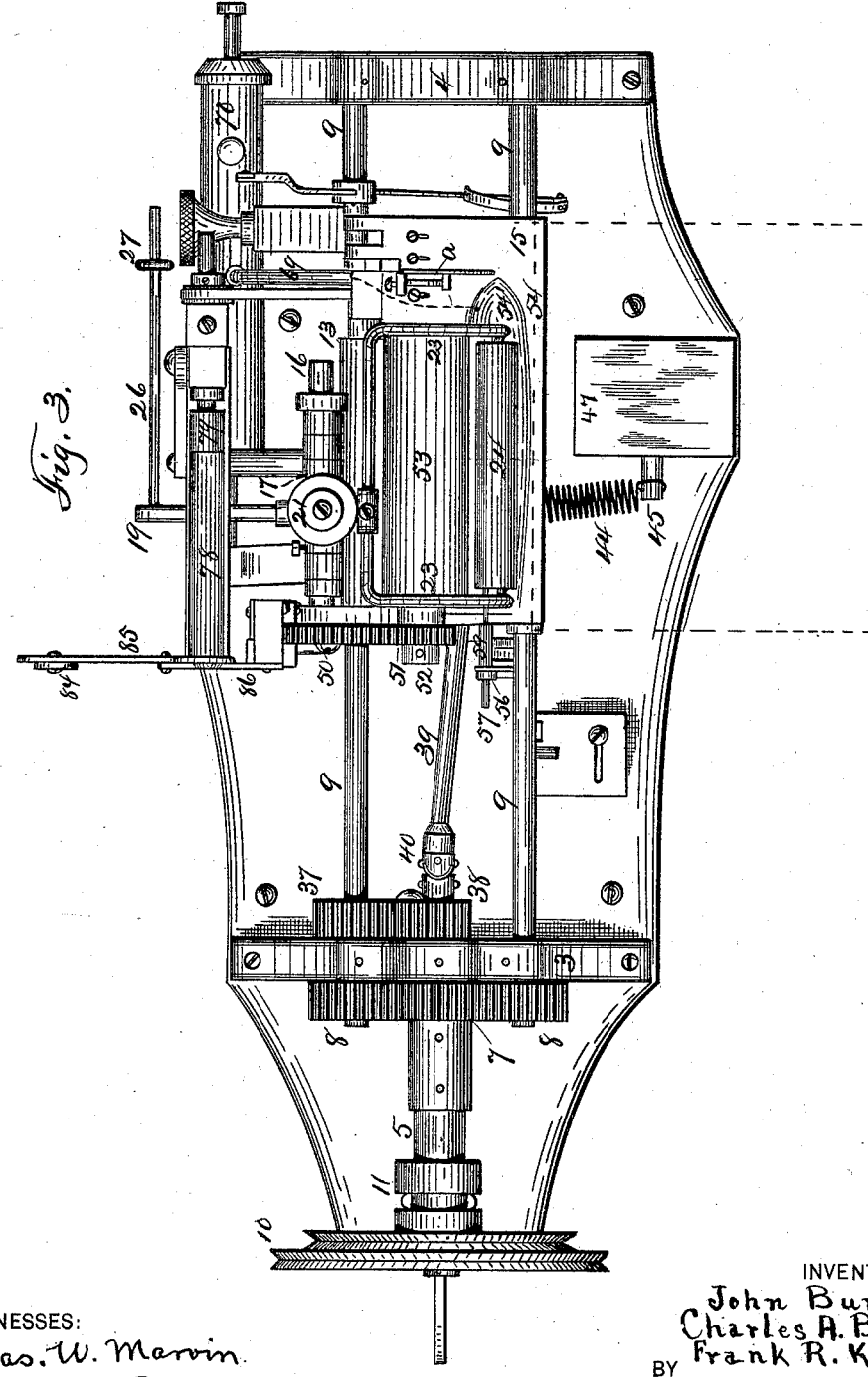
WITNESSES:
Chas. W. Marvin
M. M. Borst
INVENTORS:
John Bunn.
Charles A. Baker.
Frank R. Keyes.
BY
Smith & Vinson
ATTORNEYS.

(No Model.) 9 Sheets—Sheet 4.

J. BUNN, C. A. BAKER & F. R. KEYES.
CIGAR BUNCH ROLLING MACHINE.

No. 535,048. Patented Mar. 5, 1895.

WITNESSES:
INVENTORS:
ATTORNEYS.

(No Model.) 9 Sheets—Sheet 5.
J. BUNN, C. A. BAKER & F. R. KEYES.
CIGAR BUNCH ROLLING MACHINE.
No. 535,048. Patented Mar. 5, 1895.
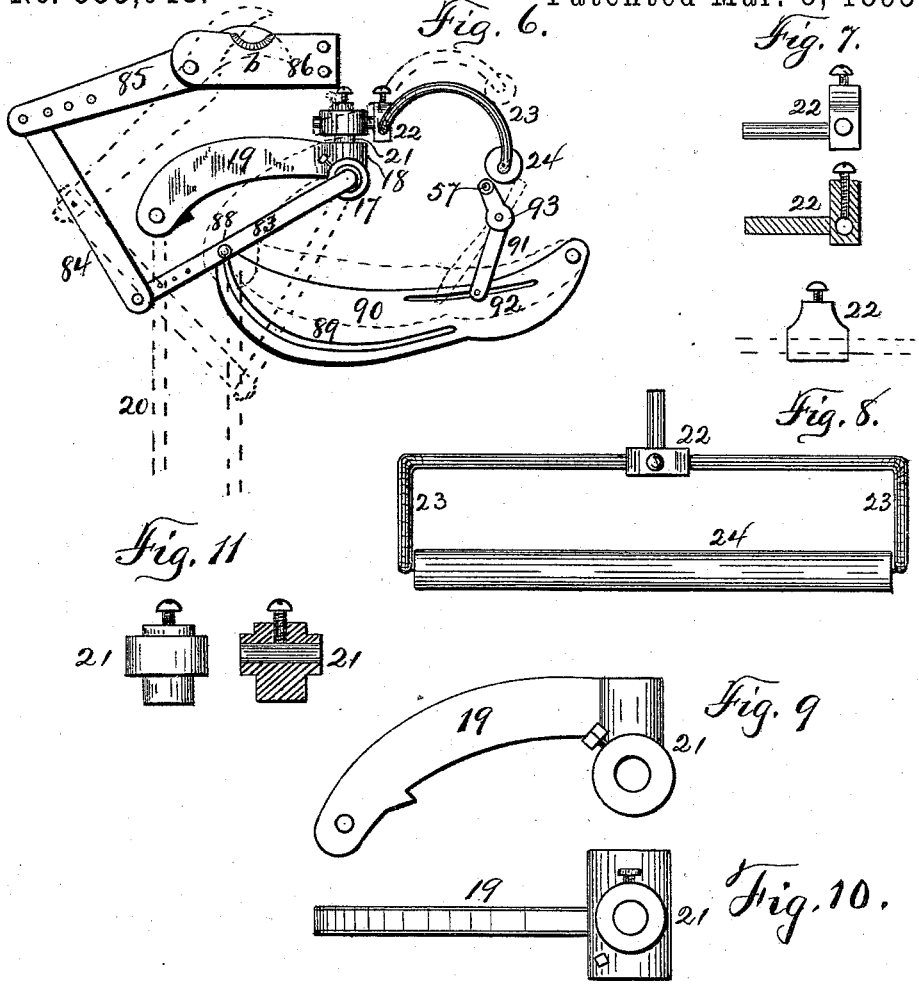
WITNESSES:
Chas. W. Marvin.
M. M. Borst.
INVENTORS.
John Bunn
Charles A. Baker.
Frank R. Keyes.
BY
Smith & Denison
ATTORNEYS.

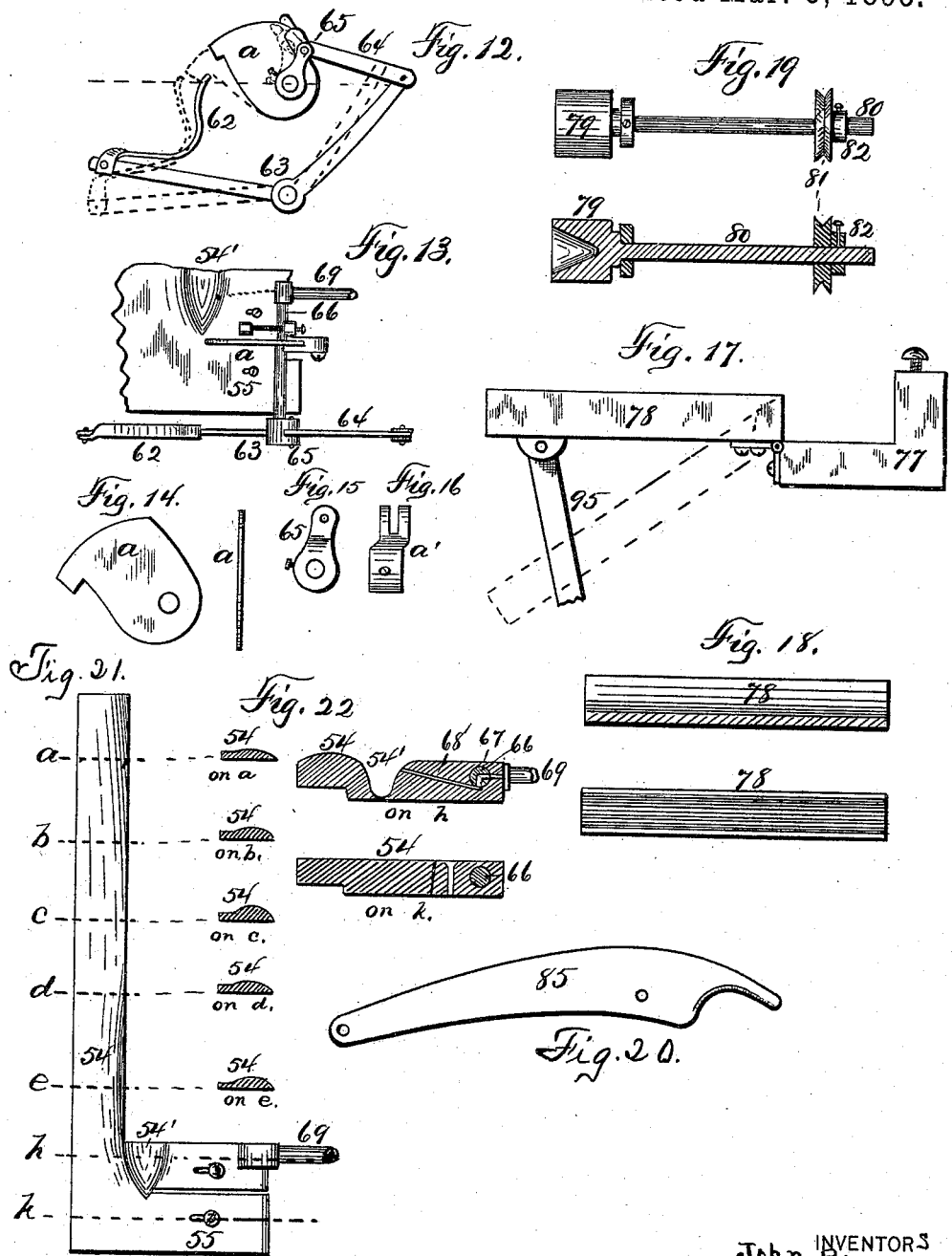

(No Model.) 9 Sheets—Sheet 7.
J. BUNN, C. A. BAKER & F. R. KEYES.
CIGAR BUNCH ROLLING MACHINE.
No. 535,048. Patented Mar. 5, 1895.
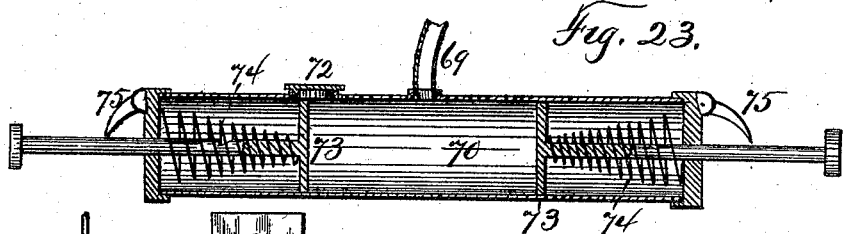
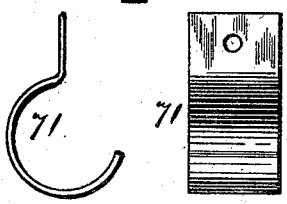
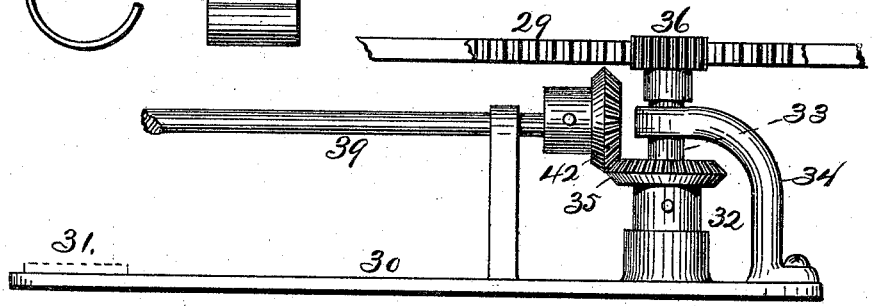
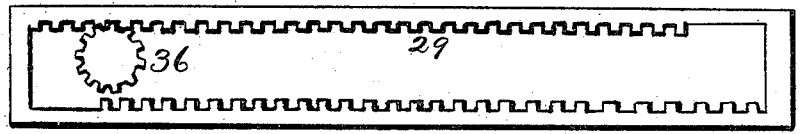
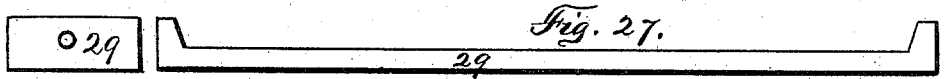
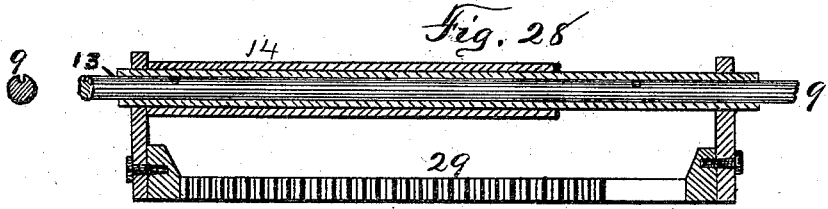
WITNESSES:
Chas. W. Marvin.
M. M. Borck.
INVENTORS
John Bunn.
Charles A. Baker.
Frank R. Keyes.
BY
Smith & Winslow
ATTORNEYS.

(No Model.) 9 Sheets—Sheet 8.

J. BUNN, C. A. BAKER & F. R. KEYES.
CIGAR BUNCH ROLLING MACHINE.

No. 535,048. Patented Mar. 5, 1895.

WITNESSES:
Chas. W. Marvin.
M. M. Borst

INVENTORS.
John Bunn.
Charles A. Baker.
BY Frank R. Keyes.

Smith & Denison
ATTORNEYS.

(No Model.) 9 Sheets—Sheet 9.

J. BUNN, C. A. BAKER & F. R. KEYES.
CIGAR BUNCH ROLLING MACHINE.

No. 535,048. Patented Mar. 5, 1895.

WITNESSES:
Chas. W. Marvin.
Conie Schoenick.

INVENTORS:
John Bunn
Charles A. Baker
Frank R. Keyes
BY
Smith & Denison
their ATTORNEYS.

UNITED STATES PATENT OFFICE.

JOHN BUNN, CHARLES A. BAKER, AND FRANK R. KEYES, OF BINGHAMTON, NEW YORK; SAID BUNN ASSIGNOR TO SAID BAKER AND KEYES.

CIGAR-BUNCH-ROLLING MACHINE.

SPECIFICATION forming part of Letters Patent No. 535,048, dated March 5, 1895.

Application filed May 28, 1894. Serial No. 512,589. (No model.)

*To all whom it may concern:*

Be it known that we, JOHN BUNN, CHARLES A. BAKER, and FRANK R. KEYES, of Binghamton, in the county of Broome, in the State of New York, have invented new and useful Improvements in Cigar-Bunch-Rolling Machines, of which the following, taken in connection with the accompanying drawings, is a full, clear, and exact description.

Our invention relates to machines for making cigars, and particularly to those used for rolling bunches into wrappers.

Our object is to produce a machine embodying a traversing or reciprocating table, and a stationary wrapper support, contiguous thereto; in which the bunch-rolling chamber in said table comprises an endless apron upon and driven by rollers, constituting the bottom, a rearward roller constituting the back thereof, a presser-roller vertically movable above the apron and in front of the back roller, and a wrapper stretcher the inner edge of which constitutes the front wall, all journaled in or mounted upon said table, and suitable means being provided to operate the said several rollers and to adjust said stretcher to vary the width of said chamber; in which the wrapper is placed upon its support, the tuck end under the bunch and held in contact therewith by a finger, the bunch being retained in position by the walls of said chamber while being rotated by said apron; in which, as the bunch is rolled into the wrapper and just before the tip is finished the wrapper is nicked, so as to form the lap for the head of the tip, and pasted to secure it, all while in said chamber; in which the stretcher has a laterally and longitudinally convex upper face, and a straight, or substantially straight inner edge, and is provided at one end with a tip-concavity, the front edge is a curved extension of said inner edge, so that the wrapper is drawn over said convexity and stretched smooth by the rotation of the bunch and the movement of the table; in which said table is reversed in its movements by means of a drive-gear engaging with a double gear-toothed rack-bar, and means to shift said gear from one rack to the other; in which the cigar is removed from said chamber, placed in a concave trough, the tuck cut off by a vertically reciprocated tuck cutter, the tip is polished in a concaved tip-polisher and shaper, and said trough is tilted to discharge the finished cigar, said tilting being automatically accomplished.

Our invention consists in the several novel features of construction and operation hereinafter described, and which are specifically set forth in the claims hereunto annexed. It is constructed as follows, reference being had to the accompanying drawings, in which—

Figure 4:
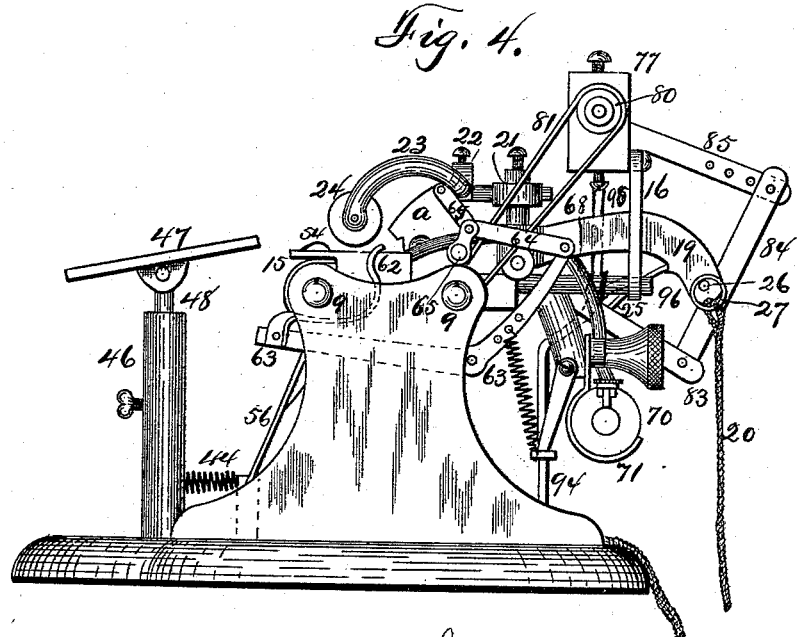
Figure 29:
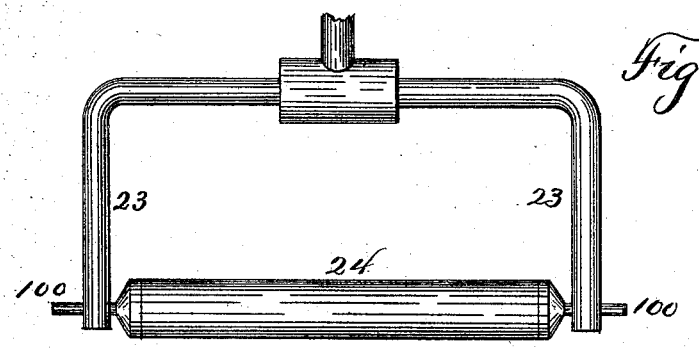
Figure 30:
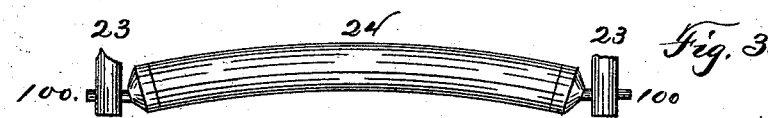
Figure 31:
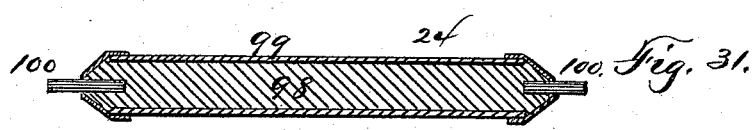
Figure 32:
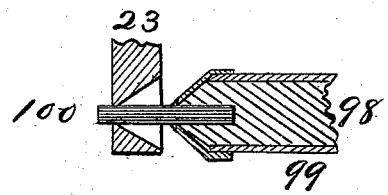
Figure 33:
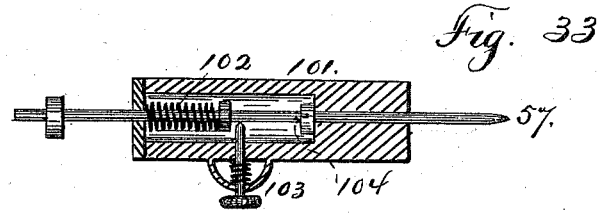
Figure 34:
Figure 35:
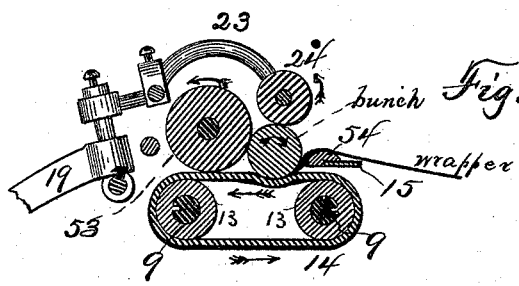
Figure 36:
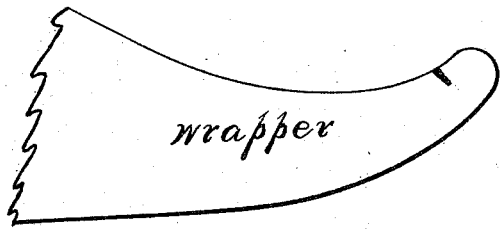

Figure 1 is a front elevation of the machine. Fig. 2 is a rear elevation thereof. Fig. 3 is a top plan thereof. Fig. 4 is an end elevation thereof. Fig. 5 is a sectional elevation on line —x—x— in Fig. 1. Fig. 6 is a detail in elevation of the cam and lever mechanism by which the presser-roller is raised and the tuck-cutter operated. Fig. 7 shows, in side elevation, vertical section and front elevation, the sleeve and arm secured to the presser-roller frame. Fig. 8 is a top plan of the presser-roller frame and roller. Fig. 9 is a top plan of the lever connected to and actuating the presser-roller, to raise and lower it and also actuating the tuck-cutter and other mechanisms. Fig. 10 is a top plan of the same. Fig. 11 shows a side elevation and a section of the connection between the oscillating lever and the arm which carries the presser-roller frame. Fig. 12 is a detail in elevation of the mechanism for nicking the wrapper and at the same time rocking the paste-valve. Fig. 13 is a detail in top plan, of part of the table, the nicking mechanism and the pasting mechanism. Fig. 14 is a plan and an edge elevation of the nicking knife. Fig. 15 is a plan of the crank-arm by which the paste valve is rocked. Fig. 16 is an elevation of the arm connected to the nicking knife and to which the rod is connected to actuate it. Fig. 17 is a side elevation of the tuck-cutting trough and part of the rod by which it is tilted. Fig. 18 shows a vertical section and a top plan of said trough. Fig. 19 shows a side elevation and a vertical section of the rotating tip-polisher. Fig. 20 is a plan of the tuck-cutting knife. Fig. 21 shows a top plan of the wrapper stretcher, its means of adjustment, the tip-concavity therein, the paste valve chamber and part of the paste-tube. Fig. 22 shows vertical cross sections of the same taken respectively upon the dotted lines marked —a—, —b—, —c—, —d—, —e—, —h— and —k—. Fig. 23 is a vertical longitudinal section of the paste reservoir and its spring actuated pistons for ejecting the paste. Fig. 24 shows an edge and front elevation of the hook supporting the paste reservoir. Fig. 25 is an enlarged side elevation of the mechanism for driving and reciprocating the table, part of one rack-bar being broken out. Fig. 26 is a top plan of the parallel rack-bars and the driving gear. Fig. 27 is an edge and an end elevation of the rack-bar. Fig. 28 is a longitudinal sectional elevation of the rack bar, the arms thereon, the guide rod and the roller thereon. Fig. 29 is a top plan of the presser-roller frame and flexible roller mounted therein. Fig. 30 is a front elevation of the same, showing the roller bent, substantially as in use, to conform to the curvature of a cigar. Fig. 31 is a longitudinal section of the roller. Fig. 32 is a sectional detail of one arm of the frame and part of the roller, showing the bearing therein conical to permit the arbor to rock freely therein when the roller is flexed. Fig. 33 is a sectional detail of a mounting for the tuck holding finger, and a spring pawl mechanism for holding it in either its projected or retracted position. Fig. 34 is a longitudinal vertical section of the wrapper stretcher. Fig. 35 is a vertical sectional elevation of rollers, apron, presser-roller and its mounting, the wrapper stretcher, table, and a bunch upon the apron being rolled, the arrows indicating the direction of rotation of the several parts. Fig. 36 is a plan of part of a wrapper, as nicked.

—A— is the bed of the machine upon which standards —3— —4— are erected and the drive shaft —5— is journaled in the standard —3— and in a bracket —6— thereon; and —7— is the drive-gear on said shaft, engaging with the pinions —8— upon the auxiliary shafts —9—. A drive pulley —10— is secured on said drive shaft and an ordinary clutch —11— and bell-crank lever —12— are operated by any ordinary means to start and stop the machine. Rollers —13— are splined upon said shafts —9— and adapted to be traversed or reciprocated thereon in the usual manner and an endless apron —14— is mounted upon and is driven by the rotation of said rollers. A table —15— is mounted upon and adapted to traverse said shafts —9—, and a shaft —16— is journaled in suitable bearings upon the rear of the table. —17— is a sleeve secured upon said shaft. —18— is a boss upon said sleeve; —19—, an arm upon said boss and —20— is a cord running to a treadle (not shown) by which said arm is depressed. Upon a post —21— upon said boss a presser frame is mounted, comprising a stem and sleeve —22—; an angular and arching bar —23— through said sleeve and adjustable by means of a set-screw as shown, and —24— is the presser-roller journaled in said frame, and by depressing the arm —19— the frame and roller are lifted vertically and the spring —25— engages with said arm, raises it and depresses said roller.

The cord —20— is connected to the arm —19— by a rod —26— (Fig. 3) through an eye —27— on said cord, so that as the table reciprocates, as heretofore described, said arm is carried with it, said rod reciprocates through said eye, and the presser-roller can be operated wherever the table may be. From this table a frame is suspended, comprising a longitudinally slotted body —29— (Figs. 25 to 28) consisting of rack-bars having rack-teeth upon their parallel inner edges, except that each has a blank space at an end free from teeth.

Upon the base a shifting bar —30— is pivoted at —31—, a post —32— is erected (Fig. 25) upon the free end, and a shaft —33— is journaled therein and upon a bracket —34— upon said bar. —35— is a bevel-gear upon said shaft and —36— a spur-gear thereon adapted to engage with the rack-bars of the body —20— which is hereinafter called the double rack-bar.

In Figs. 1, 2 and 3, it will be seen that a pinion —37— on one of the shafts —9— meshes with a gear —38— upon a shaft —39— journaled in the standard —3— and in a bearing —41— upon the bar —30— and provided with a universal joint —40—, and —42— is a bevel gear engaging with the gear —35— to drive the gear —36—, which is normally held in engagement with one rack by the spring —44— to propel the table forward until the gear reaches the blank space in said rack, when the table automatically stops; and to reverse the table, strain is applied to the cord —43— to swing the bar —30— and to bring the gear —36— into engagement with the other rack and the table returns and stops, when said gear reaches the blank in that rack, and remains there until said strain is removed, and said spring then throws said gear into re-engagement with the first rack; said spring being connected to said shifting bar and to a stud —45— upon a standard —46— upon the bed. A feed table or wrapper suppport —47— is mounted upon said standard, having a stem inserted thereinto and adjustable vertically therein by a set-screw, as shown in Figs. 3, 4 and 5. In Figs. 1 and 3, a plate is shown upon said stem, to which the support (dotted lines Fig. 3) can be secured. Upon the rear shaft —9— a gear —49— (Fig. 5) is splined or mounted and engages with a pinion —50— in engagement with a gear —51— secured upon a shaft journaled in links —52— mounted upon the table, and carrying a roller —53— which is driven by the rotation of the shaft —9—. Upon the table a stretcher —54— is mounted, shown in detail in Figs. 21, 22 and 34, consisting of a metallic plate, which is longitudinally and transversely convex, and —54'— is a concavity in said plate of substantially the shape of the tip of a bunch or cigar and the front wall of which is in curved extension of the rear edge of the stretcher, said stretcher being adjustable forward and back with reference to the roller —53— by means of the slot in the stretcher and the bolt —55— through it into the table, and the inner edge of said stretcher forms a substantially straight wall against which the bunch is rotated by said apron, and thereby the bearing of the wrapper upon the stretcher is at all times at substantially a uniform distance from the axis of the rotating bunch. The presser-roller holds the rotating bunch upon the apron and the roller —53— forms the rear wall of the bunch-rolling chamber in the table. The tip-concavity —54'— receives the tip of the bunch while it is being rolled into the wrapper and also the tip of the finished cigar is rotated therein. The stretcher is adjustable to adjust the machine for bunches of different diameters, and should be set so that the front of the bunch will lie close to the rear edge of the stretcher.

In Fig. 1 a mechanism is shown for holding the tuck end of the wrapper against the tuck end of the bunch until the bunch is partly rolled into the wrapper, comprising a post —59— pivoted upon the table, a sleeve bearing —58— transverse to the top of said post, a wire-like finger or tuck-holder —57— loose in said sleeve, and a lever —56— pivoted upon the side of the post —59— and having its upper end in engagement with said finger, and its lower end adapted to be brought by the traverse of the table into engagement with the stop —61— upon the bed, and whereby said lever is swung to retract said finger from within the winds of the wrapper and release the cigar for removal. A spring —60— engages with said lever to throw said finger forward again when said lever passes said stop. A handle —62— is passed through a slot in the table and connected to a bell-crank lever —63— and a link —64— connects said lever to a crank-arm —65— upon a rock-shaft —66— journaled upon the table, and —a— is a nicking knife secured upon said rock-shaft, of substantially the form shown; and when said handle is pulled forward, said shaft is rocked and the knife cuts a nick in the wrapper, substantially as shown in Fig. 36, said nick creating the lap necessary to form the head and finish the tip of the cigar.

A valve —67— is mounted on the table, which is opened or closed by the rocking of said shaft —66— and a conduit —68— and pipe —69— connect it to the paste reservoir —70— mounted upon one or more brackets —71— (Fig. 2). A removable cap —72— closes a filling opening in said reservoir, and —73— are pistons therein, each actuated inwardly by a helical spring —74— between it and the end of the cylinder; said pistons being mounted upon stems, substantially as shown, each stem having a notch with which the pawl —75— engages when the piston is drawn back, so as to fill the reservoir with paste between said pistons, and when the pawl is released said springs operate to compress the paste between said pistons and to eject it through said conduit and valve onto the nicked end of the wrapper to secure it upon the tip. A spring —97— operates to close said valve and also to retract the nicker.

Referring to Figs. 2, 3, 5 and 6, rods —76— support the stationary bearing block —77— above the plane of the table, and —78— is a trough hinged to said block, and —79— is a concaved head rotatable in said trough and driven by the shaft —80— journaled in said block, the pulley thereon, belt —81— and a pulley on one of the roller shafts —9—, said shaft and head being adjustable by means of a collar —82— and a set-screw therein, mounted on said shaft, to cigars of different lengths.

Upon the outer end of the shaft —16— an arm —83— is secured (Figs. 5 and 6) and a link —84— connects it to the tuck-cutting knife —85— which is pivoted upon a bar —86— upon a standard or standards —87— erected upon the table, so that when the arm —19— is depressed to raise the presser-roller, said shaft is partly rotated thereby and said arm —83— is swung down as shown by the dotted lines in Fig. 6, and the tuck-cutter is opened to receive a cigar tuck and when said arm is released, the spring —25— both returns the presser-roller to its normal position and actuates the tuck-cutter to cut off the tuck. A pin —88— upon the arm —83— engages with a cam-way —89— in the rocker —90— pivoted on the table and a link —91— connected to the cam-way in said rocker oscillates the finger —57— through the crank-arm —93— to which the link is connected. A lever —94— is pivoted upon the bed or upon a post erected thereon (Figs. 1 and 2) and connected to the table at —96— and —95— is a link also pivoted at —96— and hinged to the bottom of said trough —78—.

In Figs. 29, 30, 31 and 32, we show our flexible presser-roller and mounting. This consists of a flexible and more or less elastic body —98— as a piece of what is known as flexible shafting, a rubber sleeve —99— thereon and independent gudgeons in the ends of said body, which fit freely in the tapered or conical bearings in the arms of the presser-frame, whereby the ends of said roller being beveled, said gudgeons can both reciprocate or rock therein when said roller is bent.

In Fig. 33, —101— is a tubular recessed and shouldered body, —102— a spring therein engaging with the finger —57— to project it and —103— is a pawl adapted to engage with a notch —104— in said finger to hold it when retracted until the pawl is tripped.

In operation, the presser-roller is raised, a bunch placed in the bunch-chamber in the reciprocating table, and said roller is lowered to hold the bunch onto the endless apron. Then the finger —57— is retracted, a wrapper is placed upon the wrapper support and over the stretcher with its tuck-end between the finger and bunch and is gripped against said bunch by the released finger. Then the forward movement of the table rotates the bunch and rolls it into the wrapper and when this is done for a short distance, the finger is retracted by the lever—56—striking the stop-post —61—. Inasmuch as the stretcher increases in convexity toward the center, which is opposite the center of the bunch and tapers therefrom down toward the tip-concavity, it operates, aided by more or less hand pressure, to stretch the wrapper so that it is tight, smooth and even upon the bunch for its whole length. As the bunch is nearly rolled, the operator nicks the wrapper, as described, so that it will properly lap around and over the tip and form the finishing head or point of the tip of the cigar. When the nicker is operated, a modicum of paste is ejected onto the tip or wrapper head, and the rotation of the tip in the concavity, rolls it into the wrapper head and laps it, smooths it and finishes the cigar tip, aided possibly by the touch of a finger of the operator. Then the presser-roller is raised to remove the cigar and to insert another bunch, the cigar is placed in said trough with its tip in the cavity of said head, and is held by the tuck-cutter for an instant while the tuck is cut off, and during this time the head polishes the tip. The oscillation of the arm —83— through the pin—88—, cam-way—89— and rocker—90— throws the tuck-finger forward against the front of the bunch chamber, so that the tuck of the wrapper is readily inserted between it and the bunch, and when the cigar-tuck has been cut, the retraction of the tuck-cutter throws the tuck-finger against the wrapper and grips it against the bunch. Then when the table starts to roll the next bunch, the trough is tilted and the cigar therein falls into a suitable receptacle.

By the use of a flexible presser-roller, adapted to fit the contour of the bunch, the cigars are made of uniform shape and size and of finer finish.

This machine is also adapted to bunch making, in applying the binder to the filler, so we do not limit ourselves to its use in rolling prepared bunches into wrappers.

It will be readily seen that the roller —53— and its driving mechanism can be dispensed with, if deemed advisable. It will be further seen that the wrappers should be cut to a suitable form, before being used.

Having described our invention, what we claim, and desire to secure by Letters Patent, is—

1. A reciprocating table actuated by and in combination with a rack-bar, consisting of parallel racks connected together and connected to the table, said racks having blank spaces at their opposite ends, an oscillating frame, a continuously rotated driving gear carried thereby and adapted to alternately engage with said racks to drive the table, and stop it when it reaches the blank space of a rack, and means to shift said gear from one rack into engagement with the other to drive the table in the opposite direction.

2. The combination with a reciprocating table, of a wrapper-stretcher thereon, convex both laterally and longitudinally upon its upper face, and provided with a tip concavity an endless apron adapted to roll the bunch against the inner edge of said stretcher and in said concavity, a vertically movable presser-roller above said apron and means to support the wrapper.

3. The combination with a traversing table, of a wrapper-stretcher thereon, having a straight inner edge and being convex both laterally and longitudinally upon its upper face, and provided with a tip concavity, an endless apron adapted to roll the bunch against the inner edge of said stretcher and in said concavity, a vertically movable presser-roller adapted to hold a bunch against said stretcher and means to support the wrapper.

4. The combination with a reciprocating table, of a convex wrapper-stretcher mounted thereon and forming the front wall of the rolling chamber therein, and having a concavity at one end, an endless apron adjacent to said stretcher, a presser-roller above said apron, a roller in the rear of said presser roller forming the rear wall of said chamber, a stationary wrapper support contiguous to said stretcher, and means to actuate said apron to rotate a bunch placed thereon.

5. The combination with a reciprocating table, having a bunch-rolling chamber therein as described, a wrapper-stretcher upon said table forming the front wall of said chamber and being convex both laterally and longitudinally and provided with a tip-receiving concavity, of a vertically reciprocating wrapper-nicking knife adjacent to said concavity and means to operate it intermittently, and a wrapper-support.

6. The combination with a traversing table upon a stationary base, of a tilting cigar-receiving trough erected upon said table and carried thereby, and a tip-receiving concaved head mounted in alignment with said trough, and means to rotate said head in said trough, while said trough remains stationary.

7. The combination with the traversing table, of a cigar-receiving trough hinged at one end to a suitable support and means to connect it to said table, a tuck-cutting knife at its other end pivoted upon a support, and means to operate said knife and to tilt said trough.

8. In a cigar machine, a presser-frame having a flexible roller provided with independent end arbors, having their bearings in said frame and adapted to be reciprocated therein longitudinally when said roller is flexed, in combination with suitable cigar-bunch supporting and rotating mechanism.

9. In a bunch-rolling machine, a presser-frame, a flexible roller provided with independent end-arbors journaled in bearings so constructed as to permit them to rock therein when said roller is bent, in combination with suitable cigar-bunch supporting and rotating mechanism.

In witness whereof we have hereunto set our hands this 24th day of April, 1894.

JOHN BUNN.
CHAS. A. BAKER.
FRANK R. KEYES.

In presence of—
C. W. SMITH,
HOWARD P. DENISON.